Patented Apr. 21, 1953

2,636,057

UNITED STATES PATENT OFFICE 2,636,057

DEHYDRATION OF ALCOHOLS TO OLEFINS

Haskell W. Cutcher and Charles A. Ray, Borger, Tex., assignors to Phillips Petroleum Company, a corporation of Delaware No Drawing. Application August 23, 1949, Serial No. 111,969

10 Claims. (Cl. 260—682)

This invention relates to a novel catalyst and to a process for employing the same.

In one of its aspects the invention relates to a novel catalytic composition useful in the dehydration of alcohols. In another of its aspects the invention relates to a process for the catalytic dehydration of alcohols. In still a further aspect the invention relates to a novel catalyst for the dehydration of certain alcohols to their corresponding olefins. In still another of its aspects the invention relates to a novel process for the preparation of olefins, particularly 1-olefins from the corresponding alcohols, employing a novel catalyst composition comprising certain preselected forms of aluminum oxide containing substances.

Other aspects, the objects and advantages of the invention are apparent from the disclosure and the appended claims.

It is well known in the prior art to dehydrate various alcohols to form the corresponding olefins. Such processes usually employ a catalyst in order to increase the rate of reaction and the yield of the desired olefinic product. Many of these processes employ activated aluminas as a catalyst because of their unique ability to preferentially catalyze the dehydration alcohols to 1-olefins instead of to 2-olefins. However, activated alumina catalysts heretofore employed do not possess satisfactory catalytic activity and, accordingly, the conversion of alcohols to olefins is not as large as desired. Furthermore, the catalyst life of activated aluminas is uneconomically short, that is, from about seven to ten days and hence the high replacement costs of these catalysts are a major item in the operating cost of a dehydration process employing such catalysts. Therefore, it would appear highly desirable to discover a dehydration catalyst with the ability of an acticated alumina to selectively produce 1-olefins from alcohols and yet possess an economically long catalytic life not possessed by an activated alumina.

According to this invention it has been found that aliphatic alcohols can be dehydrated preferentially to corresponding 1-olefins in the presence of an admixture of an activated alumina and an activated bauxite. Still according to this invention it has been found that the conversion of an alcohol to a 1-olefin and yield of said 1-olefin produced by the dehydration of a corresponding alcohol in the presence of an activated alumina catalyst as used to the present time can be increased by admixing minor portions of an activated bauxite with said alumina. Still further according to this invention it has been found that the life of an activated alumina catalyst employed in an alcohol dehydration process can be greatly increased, without substantially affecting the ability of the said alumina to selectively catalyze the production of a 1-olefin in preference to a 2-olefin from the corresponding alcohol, by admixing therewith minor portions of an activated bauxite.

Thus, according to this invention, an aliphatic alcohol can be dehydrated selectively to the corresponding 1-olefin by passing the said alcohol over a catalyst comprising a mixture of an activated alumina and an activated bauxite whereby an increased yield of 1-olefin is obtained and the catalyst mixture can be employed over a longer period of time.

Various aliphatic alcohols can be employed as feedstocks in the process of this invention. The alcohol to be dehydrated should be selected to correspond with the desired olefinic product. The alcohols which can be dehydrated to produce 1-olefins range from ethyl to the higher alcohols such as octadecyl, nonadecyl and even higher. Also various mixtures of these different alcohols can be simultaneously dehydrated to produce a mixture of corresponding olefins. The purity of the alcoholic feedstock will largely determine the purity of the olefins produced. Hence if this process is employed to produce olefins of an extremely pure grade, such as research-grade olefins, it is desirable to purify the alcoholic feedstock to such an extent that the olefinic product is of the desired purity.

The process of this invention can be operated over a wide range of temperatures and pressures. It has been found preferable to employ a temperature within the range of 600° F. to 900° F., preferably 675° F. to 850° F. and still more preferably from about 700° to about 750° F. The pressure which is employed in this process should be sufficiently low to permit vapor phase operation, especially when dehydrating the lower boiling alcohols such as ethyl, propyl, butyl, etc. The exact pressure employed will depend upon the temperature selected and upon the boiling point of the alcoholic feed. As a general rule, the pressure can range from about 5 to 500 pounds per square inch, preferably 50 to 350, still more preferably from about 75 to about 100 pounds per square inch. The space velocity of the reactants through the catalyst as expressed in units of alcoholic feed per unit of catalyst per unit of time will vary with the conversion temperature, the conversion pressure, and also with the nature of the alcohol being dehydrated. However the optimum flow rate of alcohol through the catalyst can be determined easily by mere routine test. As a general rule, we have found that the flow rate of the alcohol can range from about 5 to about 0.2 pounds of alcohol per pound of catalyst per hour, preferably from about 1.5 to about 0.6 pounds of alcohol per pound of catalyst per hour.

The catalyst employed in this invention is comprised of an admixture of two aluminous compounds. As stated, it is the usual practice in the prior art to employ an activated alumina as an alcohol dehydration catalyst. We have found that the dehydrating activity of an activated alumina can be increased and that the catalyst life of an activated alumina so employed can be greatly extended by admixing therewith small portions of another aluminous compound, namely, an activated bauxite.

The aluminas employed in this invention are activated, i. e. adsorptive, aluminas. Many aluminas cannot be activated and hence are not adaptable to the process of this invention. Alpha alumina, for example, which is a corundum form, contains little or no inner surface, cannot be activated, and is entirely unsuitable. Also the alumina beta monohydrate which occurs in nature as a mineral diaspore is likewise unsuitable. The alumina beta monohydrate, diaspore, has little adsorptive capacity and if heated to drive off part of its water, it is converted directly to inactive alpha alumina. Suitable activated aluminas, on the other hand, can be prepared from the class of aluminas denoted as gamma aluminas which class is comprised of gamma alumina per se and also of all the so-called hydrated aluminas which, upon heating, are converted to alpha alumina through the gamma form. Beta aluminas which, upon heating, are converted directly to alpha alumina are not suitable in this process. It is to be noted that alpha alumina per se is not employed in the process of this invention but that the activated aluminas suitably employed in this invention are the partial hydrates of alpha alumina which hydrates are further characterized by their property of forming gamma alumina when suitably hydrated. The aluminas which, upon heating, are converted into alpha alumina through gamma alumina and which before complete dehydration form suitable activated aluminas may be classified as:

The alumina alpha trihydrate known as gibbsite or hydrargillite: This form is readily prepared synthetically as a by-product in the Ficks-Sherwin modification of the Bayer process. In this process, sodium aluminate liquors containing particles of hydrated alumina in suspension are agitated in large tanks with the result that the sodium aluminate is decomposed and the aluminum precipitated as a hydrated alumina. During the process, deposits of particularly hard crystalline alumina alpha trihydrate form on the tank walls. These deposits are removed from time to time, broken up into pieces of the desired size and partially dehydrated by heating at a temperature between 550° F. and 1500° F. Preparation of this material is more fully described and claimed in U. S. Patent 1,868,869. Alumina alpha trihydrate can also be readily prepared by precipitation from a sodium aluminate solution. The sodium aluminate solution must be seeded with alumina alpha trihydrate crystals. The formation of the alpha trihydrate is favored by very slow precipitation, elevated temperatures and a high caustic concentration. The trihydrate thus formed is activated by heat treatment as described above.

The alumina beta trihydrate known as bayerite: It is isomorphous with hydrargillite. It can be prepared by precipitation from sodium aluminate solutions. Its formation is favored by relatively rapid precipitation at room temperature and a low concentration of alkali.

The alumina alpha monohydrate known as böhmite: This alumina is formed by the partial dehydration of either alumina alpha trihydrate or alumina beta trihydrate. This form of alumina is the preferable activated alumina employed in this invention.

Gamma alumina: This is a meta-stable anhydrous oxide which does not occur naturally but can be prepared by carefully controlled dehydration of any of the above mentioned hydrates. It is to be noted that the various water-containing forms of alumina are referred to herein in the conventional manner as hydrates, even though it is generally known that the water in these so-called hydrates does not exist in the form of hydrated water, but in the form of hydroxyl water.

Thus the activated alumina which is suitably employed in the process of this invention can be alumina alpha monohydrate prepared by dehydrating either alumina alpha trihydrate or alumina beta trihydrate or it can be gamma alumina or mixtures of alumina alpha monohydrate and gamma alumina.

The activated bauxite which we prefer to employ is a selected form of activated bauxite. Bauxites in general may be divided into three main types, red bauxite, white bauxite and gray bauxite. The activated bauxite which is to be employed in the process of this invention is prepared from the red type of bauxite by heating it under controlled conditions. Specifically, the red bauxite is first dried to remove combined water and then milled and screened to the desired mesh size after which it is activated by heating to a temperature of about 500° to about 650° F. After activation, the bauxite should have an analysis as follows:

| Component | Preferred Weight percent | Permissible ranges Weight percent |
|---|---|---|
| $Al_2O_3$ | 67 | 58–70 |
| $Fe_2O_3$ | 12 | 10–16 |
| $SiO_2$ | 6 | 6–9 |
| $TiO_2$ | 3 | 1–4.5 |
| Ignition loss at 1,800° F. | 12 | 10–18 |

The analysis denoted above as "Preferred" is meant to represent a typical analysis of an activated bauxite according to our invention and the percentage compositions set forth therein can vary within the ranges specified above as "Permissible ranges." The catalyst of this invention can be prepared by merely physically mixing together the activated alumina and the activated bauxite. The particles of each of the two aluminous components should be similar in size so that thorough mixing and intimate contact can be accomplished. Generally the particle size of the mixed catalyst can range from about 30 mesh to about 5 mesh for the usual type of alcohol dehydration process.

The catalyst employed by this invention should have a weight ratio of activated alumina to activated bauxite ranging from about 100:1 to about 3:2, preferably from about 19:1 to about 9:1. When activated bauxite is admixed with activated alumina within these ratios, the catalyst life of the alumina is greatly extended without unduly affecting the property of the alumina for selectively dehydrating alcohols to 1-olefins instead of to 2-olefins.

Example I

Butyl alcohol was contacted with activated alumina prepared as described above at a temperature of 730° F. and under vapor phase conditions of pressure. The flow rate of alcohol through the catalyst was 1 pound of alcohol per 3.3 pounds of catalyst per hour. The converted product comprised about 70 per cent 1-butene, 15 per cent 2-butene and 15 per cent other products. The catalyst life was from 7 to 10 days under these conditions.

Example II

Butyl alcohol was converted at a temperature of 730° F. and under vapor phase conditions in the presence of a catalyst comprising 92.5 per cent activated alumina prepared as described above and 7.5 per cent activated bauxite prepared as set forth above. The converted product comprised about 75 per cent 1-butene, 20 per cent 2-butene and 5 per cent other products. The catalyst life was from 16 to 22.5 days. Thus the catalyst life of a mixture of 92.5 per cent alumina and 7.5 per cent activated bauxite was about 225 per cent greater than that of the pure alumina of Example I.

Example III

Butyl alcohol was converted under substantially the same conditions as in Example II except that a catalyst comprising 90 per cent activated alumina and 10 per cent activated bauxite was employed. The converted products comprised about 70 per cent 1-butene, 25 per cent 2-butene and 5 per cent other products. The catalyst life was greater than 15 days.

Example IV

Butyl alcohol was converted under substantially the same conditions as in Example II except that a catalyst comprising 75 per cent activated alumina and 25 per cent activated bauxite was employed. The converted products comprised about 60 per cent 1-butene, 38 per cent 2-butene and 2 per cent other products. The catalyst life was greater than 15 days.

It is apparent from the foregoing examples that the admixing of limited amounts, say from 25 per cent to about 7.5 per cent of a selected activated bauxite with an activated alumina greatly increases the catalyst life of the alumina without unduly limiting the ability of the alumina to catalyze the production of 1-olefins instead of 2-olefins. Other alcohols than butyl gave similar results.

Variation and modification are possible within the scope of this invention the essence of which is that the catalyst life and catalytic efficiency of activated alumina employed in a process for dehydrating alcohols to preferentially form 1-olefins can be increased by admixing therewith minor portions of a selected activated bauxite.

We claim:

1. A catalyst composition comprising a physical admixture of a major portion of an activated alumina selected from the group consisting of alumina alpha monohydrate and gamma alumina and a minor portion of red bauxite having the following compositions expressed as per cent by weight

| | Percent |
|---|---|
| $Al_2O_3$ | from 58 to 70 |
| $Fe_2O_3$ | from 10 to 16 |
| $SiO_2$ | from 6 to 9 |
| $TiO_2$ | from 1 to 4.5 |
| Ignition loss at 1800° F | from 10 to 18 | which has been activated by heat treatment at a temperature of 500 to 650° F.

2. The catalyst composition of claim 1 wherein the weight ratio of alumina to bauxite is from 100:1 to 3:2.

3. The catalyst composition of claim 1 wherein the weight ratio of alumina to bauxite is from 19:1 to 9:1.

4. The catalyst composition of claim 1 wherein the weight ratio of alumina to bauxite is about 12.3:1.

5. In a process for dehydrating an aliphatic alcohol to preferentially produce a 1-olefin the improvement which comprises dehydrating an alcohol corresponding to said 1-olefin in the presence of a catalyst comprising a major portion of an activated alumina selected from the group consisting of alumina alpha monohydrate and gamma alumina and a minor portion of red bauxite which has been activated by heat treatment at a temperature of 500 to 650° F.

6. In a process for dehydrating an aliphatic alcohol to preferentially produce a 1-olefin the improvement which comprises dehydrating an alcohol corresponding to said 1-olefin in the presence of a catalyst comprising a major portion of an activated alumina selected from the group consisting of alumina alpha monohydrate and gamma alumina and a minor portion of red bauxite having the following compositions as expressed as per cent by weight

| | Percent |
|---|---|
| $Al_2O_3$ | from 58 to 70 |
| $Fe_2O_3$ | from 10 to 16 |
| $SiO_2$ | from 6 to 9 |
| $TiO_2$ | from 1 to 4.5 |
| Ignition loss at 1800° F | from 10 to 18 | which has been activated by heat treatment at a temperature of 500° to 650° F.

7. The process of claim 6 wherein the weight ratio of alumina to bauxite is from 100:1 to 3:2.

8. The process of claim 6 wherein the weight ratio of alumina to bauxite is from 19:1 to 9:1.

9. The process of claim 6 wherein the weight ratio of alumina to bauxite is about 12.3:1.

10. In an aliphatic alcohol dehydration process employing an activated alumina catalyst, the improvement which comprises employing a catalyst comprising such an activated alumina selected from the group consisting of alumina alpha monohydrate and gamma alumina admixed with a minor portion of a heat-treated red bauxite which, previous to said admixing with said alumina, has been activated by heat treatment at a temperature of 500 to 650° F.

HASKELL W. CUTCHER.
CHARLES A. RAY.

References Cited in the file of this patent

UNITED STATES PATENTS

| Number | Name | Date |
|---|---|---|
| 1,868,869 | Barnitt | July 26, 1932 |
| 1,913,938 | Metzger et al. | June 13, 1933 |
| 2,211,727 | La Lande | Aug. 13, 1940 |
| 2,220,430 | Stanley | Nov. 5, 1940 |
| 2,378,236 | Miller | June 12, 1945 |
| 2,406,081 | La Lande et al. | Aug. 20, 1946 |
| 2,425,463 | Garrison | Aug. 12, 1947 |
| 2,431,427 | Schulze et al. | Nov. 25, 1947 |
| 2,449,051 | Breth et al. | Sept. 14, 1948 |
| 2,449,847 | Heard | Sept. 21, 1948 |
| 2,495,278 | Nickels | Jan. 24, 1950 |